(12) United States Patent
Marler et al.

(10) Patent No.: US 7,273,071 B2
(45) Date of Patent: Sep. 25, 2007

(54) DIVERTER VALVE FOR CAPACITY CONTROL OF A REFRIGERANT ABSORPTION CYCLE DRIVING HEAT SOURCE

(75) Inventors: Mark E. Marler, Glastonbury, CT (US); Sunghan Jung, South Glastonbury, CT (US); Timothy C. Wagner, East Hartford, CT (US); Jinsang Ryu, Gyunggi-do (KR)

(73) Assignee: UTC Power, LLC, South Windsor, CT (US)

( * ) Notice: Subject to any disclaimer, the term of this patent is extended or adjusted under 35 U.S.C. 154(b) by 0 days.

(21) Appl. No.: 10/567,811

(22) PCT Filed: Sep. 1, 2004

(86) PCT No.: PCT/US2004/028320

§ 371 (c)(1),
(2), (4) Date: Feb. 9, 2006

(87) PCT Pub. No.: WO2005/026596

PCT Pub. Date: Mar. 24, 2005

(65) Prior Publication Data

US 2006/0283512 A1 Dec. 21, 2006

Related U.S. Application Data

(60) Provisional application No. 60/501,366, filed on Sep. 9, 2003.

(51) Int. Cl.
*F16K 11/16* (2006.01)

(52) U.S. Cl. .................. 137/875; 137/637; 62/104; 62/148

(58) Field of Classification Search ................ 137/637, 137/875, 876; 251/305; 62/103, 104, 148, 62/497
See application file for complete search history.

(56) References Cited

U.S. PATENT DOCUMENTS 1,015,145 A * 1/1912 Davis ......................... 237/8 C
2,383,861 A 8/1945 Hopkins (Continued)

FOREIGN PATENT DOCUMENTS

| DE | 499691 | 6/1930 |
|---|---|---|
| DE | 28 03 818 A1 | 8/1979 |
| DE | 29 01 207 A1 | 7/1980 |
| DE | 32 04 288 A1 | 8/1983 |

(Continued)

*Primary Examiner*—John Fox
(74) *Attorney, Agent, or Firm*—Carlson, Gaskey & Olds

(57) ABSTRACT

A control for controlling the amount of heated fluid entering the inlet of the driving heat source for a refrigerant absorption cycle is controlled to vary the relative amount of heated fluid entering the driving heat source inlet, and being dumped to atmosphere. Preferably, a diverter valve is utilized such that a first valve body (40) communicates the flow into the driving heat source inlet, and moves in opposition to a second valve body (46) controlling the flow through the exhaust. The two valves bodies (40, 46) are preferably mechanically linked. Since the heated fluid is not allowed to enter the refrigerant absorption cycle as its drive heating source, no additional hardware and control for dumping excess heat is necessary within the refrigerant absorption cycle. A computer control preferably drives the first valve to a precise position and the linkage ensures the second valve is also received at a precise position.

3 Claims, 3 Drawing Sheets

U.S. PATENT DOCUMENTS

| | | | |
|---|---|---|---|
| 3,679,549 A * | 7/1972 | Newman et al. | 203/12 |
| 4,388,812 A | 6/1983 | Clark | |
| 4,749,004 A | 6/1988 | Peash | |
| 6,216,737 B1 | 4/2001 | Taylor | |

FOREIGN PATENT DOCUMENTS

| | | |
|---|---|---|
| EP | 1 178 267 A1 | 2/2002 |
| WO | WO 02/086397 A1 | 10/2002 |

* cited by examiner

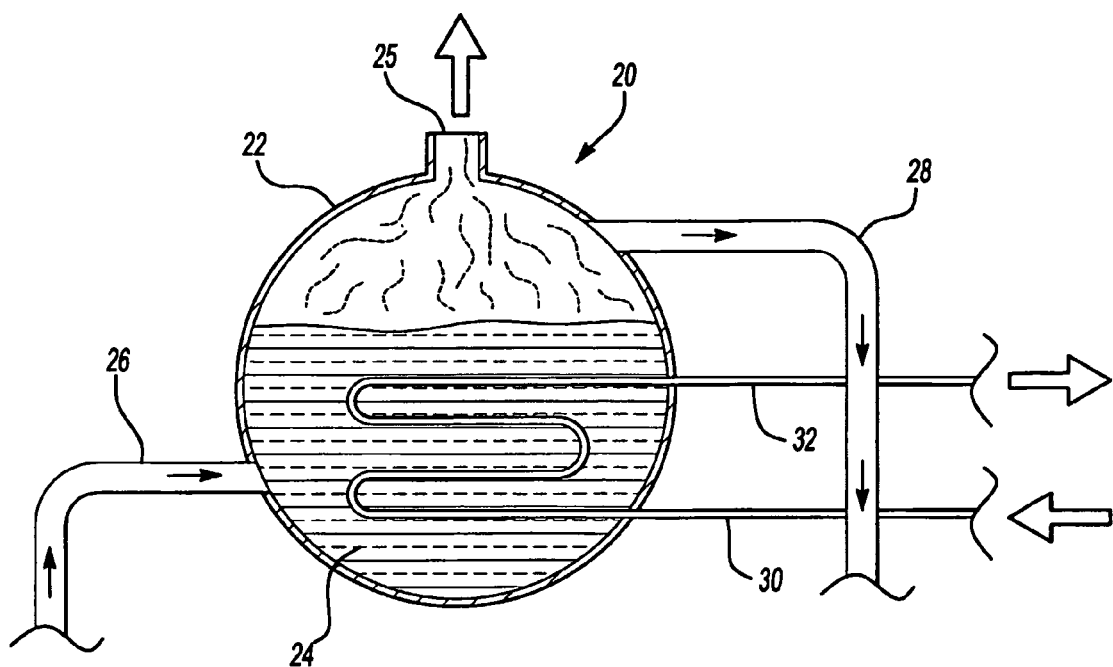
_Fig-1_
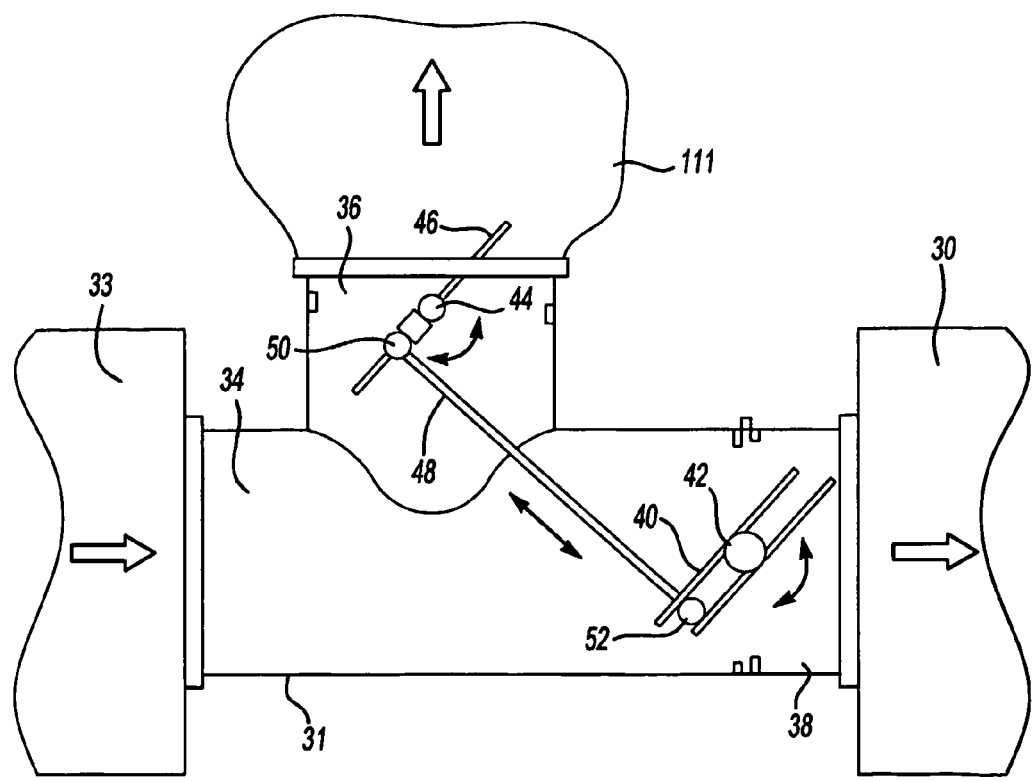
_Fig-2_ ated from the atmosphere.

DIVERTER VALVE FOR CAPACITY CONTROL OF A REFRIGERANT ABSORPTION CYCLE DRIVING HEAT SOURCE

RELATED APPLICATION

This application claims priority and benefit to provisional application 60/501,366 filed Sep. 9, 2003, the disclosure of which is incorporated herein by reference.

BACKGROUND OF THE INVENTION

This application relates to a controlled diverter valve for selectively controlling the flow of a heated fluid that is used as a driving heat source inlet for a refrigerant absorption cycle.

Refrigerant absorption cycles have been used for decades to provide a cooled or heated water source for environmental temperature control in buildings. As is known, an absorber and an evaporator in a refrigerant absorption cycle selectively receives a concentrated absorption fluid, such as a LiBr solution, and a separate refrigerant (often water), respectively. The absorption fluid is selectively dropped onto separate tube sets in the absorber and absorbs the refrigerant vapor generated from the evaporator. A dilute solution, containing both the absorption fluid and the refrigerant is then returned to a generator for generating a heated, concentrated absorption fluid. In the generator, a driving heat source drives the refrigerant vapor out of the mixed fluid. From the generator, the absorption fluid and removed refrigerant vapor are separately returned to the absorber and the evaporator, respectively. The aspects set forth above are a simplified description of a complex system.

For various reasons, the demand for cooling capacity of the absorption refrigerant cycle changes over time. With this change in capacity, the amount of driving heat source needed by the system also needs to be changed. To date, the prior art has rejected heat by various control methods once the heat is already within the cycle.

SUMMARY OF THE INVENTION

In a disclosed embodiment of this invention, a T connection is selectively connected to a heat source at one leg and to the inlet of a refrigerant absorption cycle driving heat source at a second leg. A third leg of the T directs the heated fluid from the heat source to a heat sink. The heat sink may be atmosphere, or could be a thermal/heat recovery device.

A diverter valve assembly used for flow control is positioned within the T and has two valve bodies. A first valve body selectively controls the flow of the heated fluid from the heat source as the driving heat source directly communicating with the generator. A second valve body selectively regulates flow of the heated fluid through the third leg and to the heat sink. A position control device drives the two valves to move in opposition relative to each other. That is, as the first valve moves to open, the second valve moves to close, and as the first valve moves to close, the second valve moves to open. In this manner, the control of the flow of the heated fluid through the T is precise, and controlled by the two valve bodies. In addition, the valve bodies minimize leakage of the driving heat source to atmosphere when the first valve is fully open, requesting 100 percent of the flow. Also, there are benefits in locating the flow control in this location. Since excess heat is not directed into the refrigerant absorption cycle, there is no need for additional hardware and controls to reject unwanted heat within the cycle.

Preferably, a computer-controlled motor drives a rotating shaft for driving the first valve body. A mechanical linkage preferably connects the first valve body to the second valve body such that the second valve body moves in opposition to the first valve body. A computer control may receive signals from a control for the absorption cycle, or it may itself be part of that control. At any rate, the position of the first valve body is defined by the control and is achieved precisely through the driving motor. The use of the mechanical linkage ensures that the second valve body is always moving in opposition to the movement of the first valve body. The linkage removes any need for separate synchronized actuators.

In one preferred embodiment, the mechanical linkage includes a lever fixed to rotate with the rotating shafts of both the first and second valves. These levers are pivotally connected to a linkage, such that upon rotation of the first valve body and its first shaft, the associated lever also is moved. That lever then pulls the linkage that in turn pulls the lever associated with the second valve body such that the second valve body is also driven. While a particular linkage is disclosed in this application, other ways for synchronizing the two valve bodies such as belt drives, synchronous electric motors, chain drives, etc. may be utilized.

In further features of this invention, the shafts for driving the valve body are mounted in bearings on opposed sides of the valve. Preferably, these bearings are mounted outwardly of the housing of the T. Further, the shafts preferably have a non-cylindrical cross-section at the areas received within the bearings. As a preferred embodiment, the shaft may have a generally triangular cross-section with several small spaced areas in contact with the inner periphery of the bearing. In this manner, the heat transfer from the shaft to the bearing is reduced, allowing the use of lower cost bearings, and elimination of lubricants.

In a further feature, a cooling air blower communicates cooling air into the T connection and adjacent to the first valve body, for both sealing, i.e. preventing hot fluid from flowing to the generator, and cooling the first valve body when the first valve is closed. A check valve is positioned on this cooling air line flow to prevent leaking of the driving heat source through the air seal blower, which would waste valuable heat.

These and other features of the present invention can be best understood from the following specification and drawings, the following of which is a brief description.

BRIEF DESCRIPTION OF THE DRAWINGS

FIG. 1 schematically shows a portion of a refrigerant absorption cycle.

FIG. 2 shows a T connection receiving the inventive diverter valve.

DETAILED DESCRIPTION OF THE PREFERRED EMBODIMENT

Figure 3:
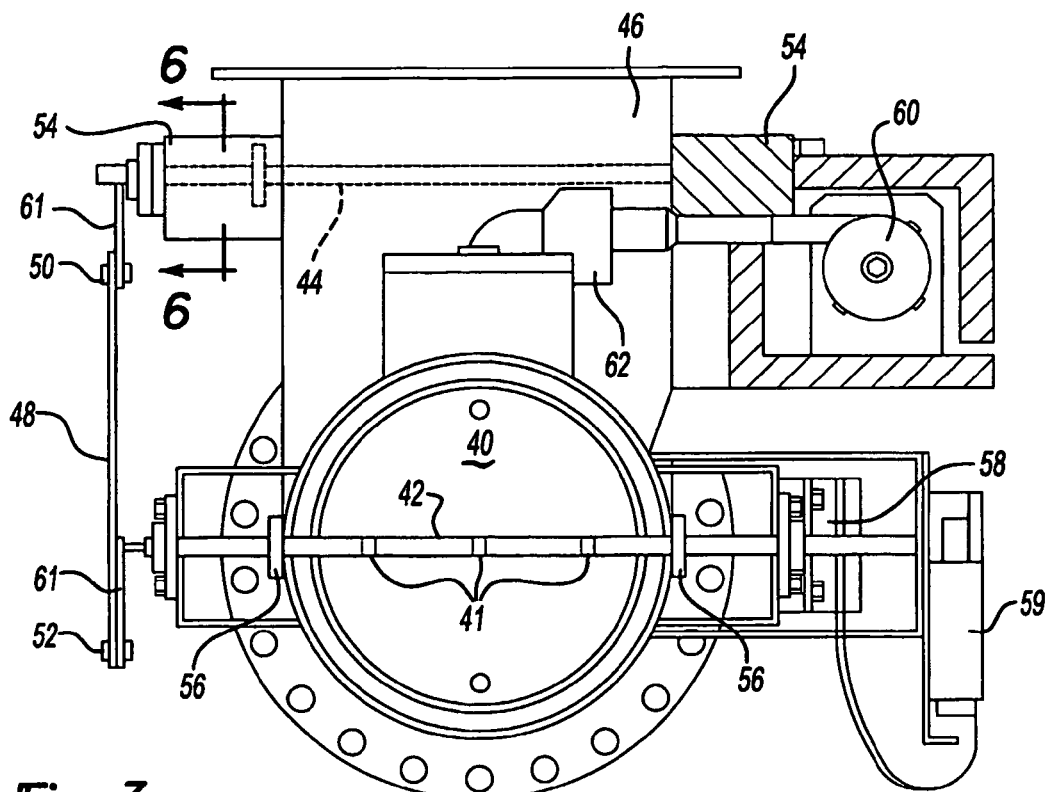
FIG. 3 is another view of the structure within the T connection.

FIG. 1 shows a generator vessel 22 that is a portion of a refrigerant absorption cycle 20. A mixed absorption fluid and refrigerant is received at 24 in the generator vessel 22. A driving heat source 30 is directed into the vessel 22 and through the fluid 24. This driving heat source 30 boils off the refrigerant (water) creating a water vapor leaving through line 25. From line 25, the water vapor goes to a cooling tower at which its temperature is lowered. This lower temperature water is then directed into an evaporator within the refrigerant absorption cycle, and cools evaporator tubes for providing cooled water for use in a temperature control system.

The absorption fluid remaining in the vessel 22 is a high concentration absorption fluid such, e.g. high LiBr concentration and low refrigerant concentration. This high concentration fluid has a high affinity for absorbing the refrigerant vapor in the vessel. The high concentration absorption fluid is also directed into the evaporator, and passes over tubes that cool the absorption fluid. A screen initially separates the refrigerant and the absorption fluid in the evaporator. However, the high concentration absorption fluid absorbs refrigerant vapor back into its solution. This combined refrigerant and absorption fluid, or low concentration (diluted) solution, then returns through line 28 to the generator vessel 22. The driving heat source 30 leaves the vessel 22 through a return line. The above is a description of the system when utilized to provide cooling water, however, the system can also be operated to provide heated water. Modifications to provide the heated water are as known in the art.

It is known to provide the driving heat source to inlet 30 from another element within the environment in which the absorption refrigerant cycle is mounted. As examples, a micro-turbine, a furnace, fuel cells, energy generators, reciprocating machines, other types of turbines, an engine cooling cycle, various vehicles, chemical or manufacturing processes, or any other source of available heat may be utilized to supply the heat fluid as a driving heat source 30.

FIG. 2 shows a T connection 31 selectively communicating such a heat source 33 at one leg 34 to the driving heat source inlet 30 for the refrigerant absorption cycle at another leg 38. Now, as known, a heated fluid is directed from the source 33 into the leg 34, and may move through the leg 38 to become the refrigerant absorption cycle driving heat source 30.

The heat source 33 may be a micro-turbine, or any other known source of heat, and preferably one that is already in the environment that is to receive the refrigerant absorption cycle 20. As is known, refrigerant absorption cycles 20 often ultimately cool the cooler water (or heat the heating water) that is directed to various floors within a building to provide temperature control.

A third leg 36 regulates the heated fluid from the heat source 33 to a heat sink 111. The heat sink 111 is shown schematically, and may be a heat recovery device or simply a dump to atmosphere. A valve body 40 controls or allows flow from the leg 34 through leg 38. Valve body 40 is driven to rotate about a shaft 42. A second valve body 46 is driven to rotate about a shaft 44 and selectively blocks the leg 36, preventing loss of heated fluid due to leakage. As shown, a linkage 48 selectively connects pivot points 50 and 52 associated with the valve bodies 46 and 40, respectively. As can be better understood below, as the valve body 40 moves to close, the linkage will ensure the valve body 46 moves to open, and as the valve body 40 moves to open, the linkage ensures the valve body 46 moves to close. In this manner, the amount of heated fluid entering the leg 38 can be precisely controlled such that only a desired amount enters the driving heat source inlet 30. The diverter valve prevents warm gas from flowing into the refrigerant absorption cycle while it is not being used for cooling or heating. In this manner, selective control of heat from the driving source is achieved in a simplified manner, and outside of the refrigerant absorption cycle 20.

While a particular mechanical connection between the valves is illustrated, other types of valve controls could be utilized within the scope of this invention. As an example, electronically controlled valves or other remotely controlled and mechanically unconnected valve sets can be utilized within the broad teachings of this invention.

As shown in FIG. 3, a motor 58 is associated with a control 59 for driving the shaft 42. The motor 58 is preferably a precisely controlled electric motor that is able to achieve an infinite number of positions of the shaft 42 such that precise control of the relative amount of heated fluid entering the driving heat source inlet 30 is achieved. Since the heated fluid is not allowed to enter the refrigerant absorption cycle 20 through its drive heating source inlet 30, no control within the refrigerant absorption cycle for dumping excess heat is necessary. Rather, the heat is not delivered into the system, and the rejection of heat is thus simplified over the prior art.

As is also shown in FIG. 3, the linkage 48 connects levers 61 that rotate with the shafts 42 and 44. The shafts 42 and 44 are mounted within bearings 56 and 54, respectively. Notably, the bearings 54 and 56 are positioned on each side of their associated valve body 46 and 40, and outwardly of the T housing.

As further shown in FIG. 3, a cooling air blower 60 communicates a cooling air through a line having a check valve 62 and into the body of the T connection 31.

Figure 4:
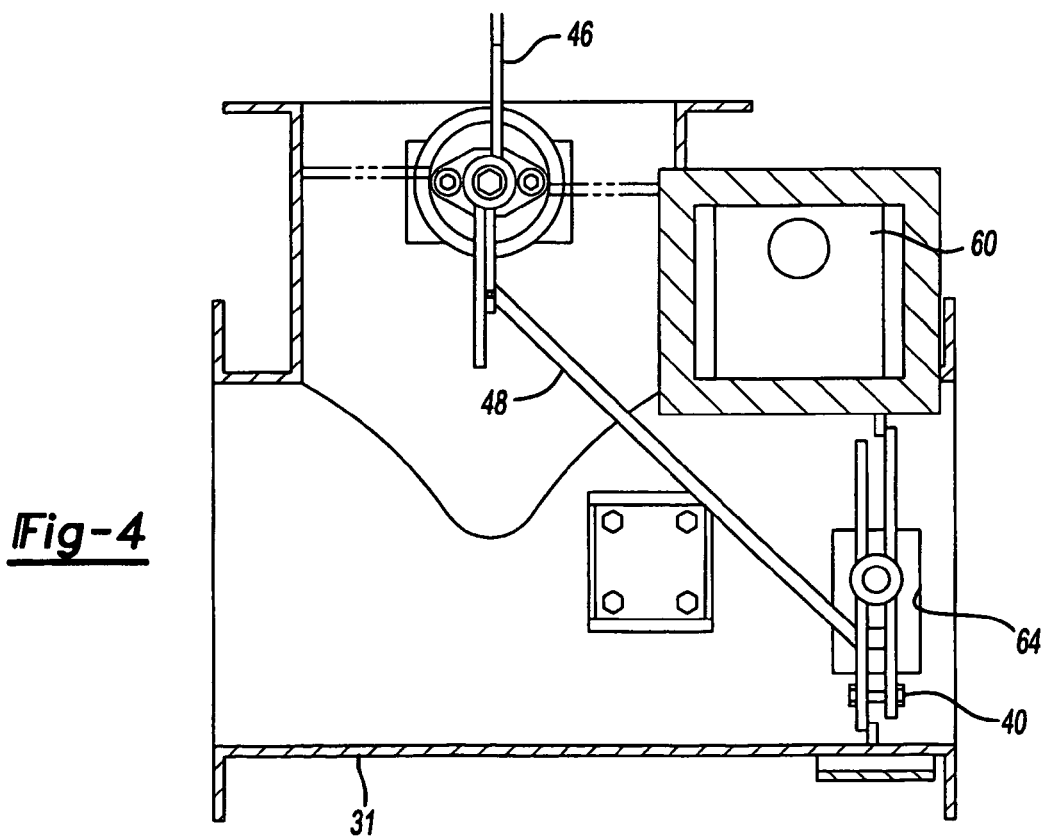
FIG. 4 is a further view of the T connection.

As shown in FIG. 4, an outlet 64 from the line receiving the cooling air flow communicates the cooling air to a position adjacent the valve 40. Typically, cooling air is injected between the two blades of the valve body when the valve 40 is closed. Thru-holes 41 in shaft 42 allow the cooling to pass from an upper end of the valve 40 to a lower end.

Figure 5:
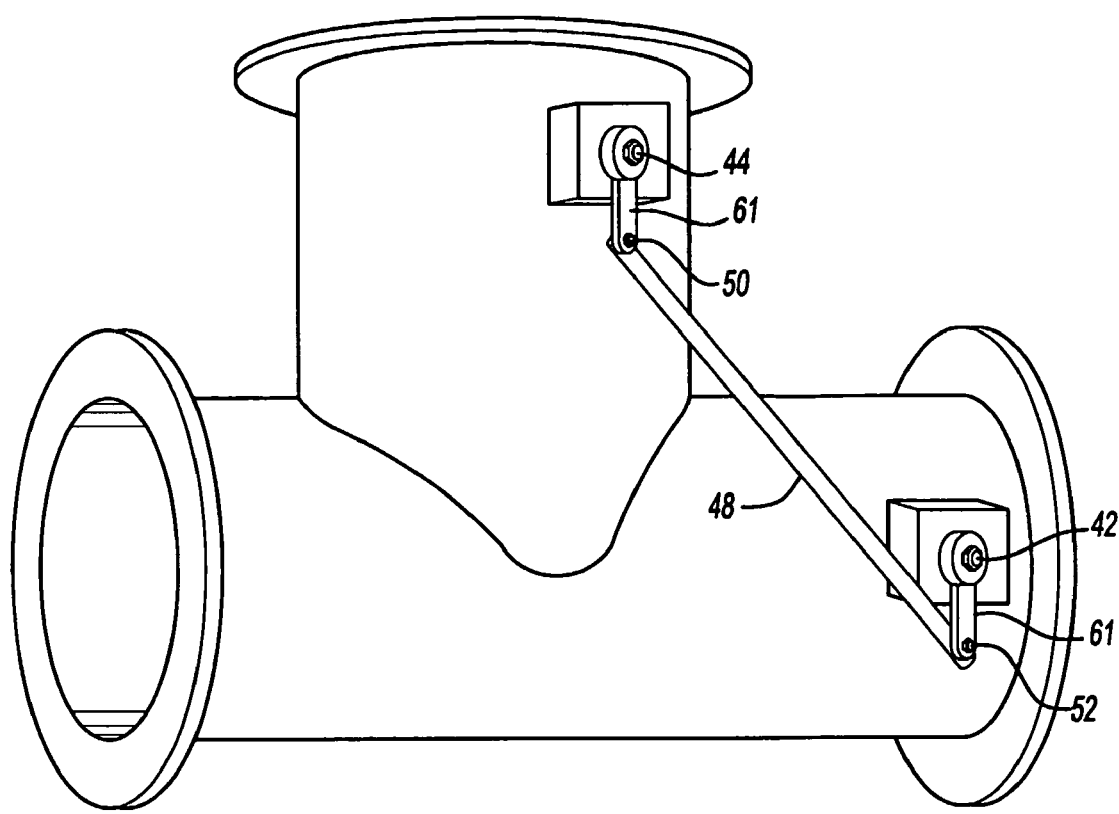
FIG. 5 is an outside view of the T connection.

As can be perhaps best seen in FIG. 5, the linkage 48 pivots at pivot point 50 and 52 to drive the levers 61, and thus communicate rotation of one shaft 42 to the second shaft 64. As can be appreciated, as the shaft 42 is driven to close its associated valve 40, the linkage 52, 48, 50, 61 drives the shaft 44 to move valve body 46 in opposition.

Figure 6:
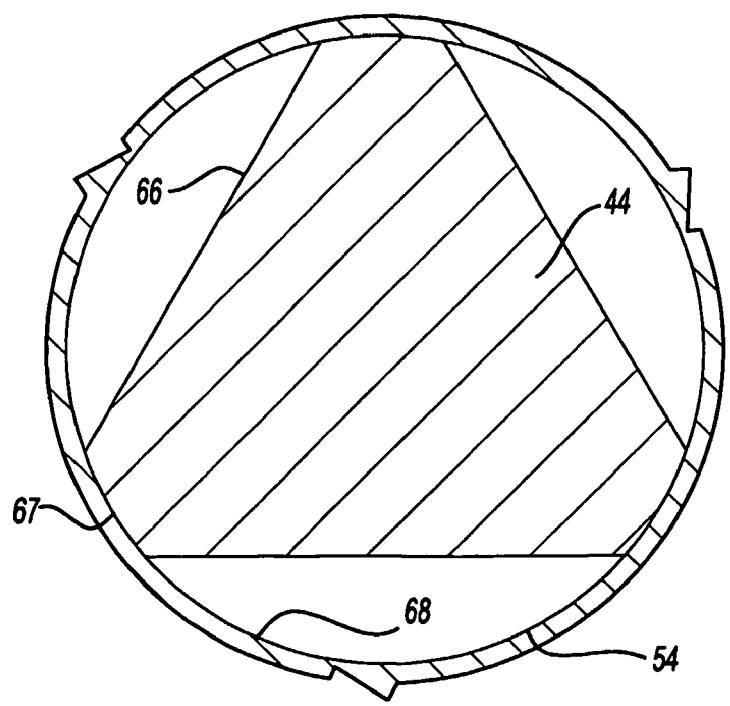
FIG. 6 shows the cross-section of a shaft for driving a valve.

FIG. 6 shows another feature of this invention. The shaft 44, and the shaft 42 (not shown) have an outer periphery with removed portions 66 and remaining part cylindrical portions 67. Only part cylindrical portions 67 contact the inner periphery 68 of the bearing 54 (or 56). In this manner, heat built up in the shafts 42 and 44 will only be transferred to the inner periphery 68 over a very small area, limiting bearing temperature. Preferably, the percentage of contact area is between 10-65% of the total inner periphery 68.

Preferred embodiments of this invention has been disclosed, however, a worker of ordinary skill in this art would recognize that certain modifications would come within the scope of this invention. For that reason, the following claims should be studied to determine the true scope and content of this invention.

The invention claimed is:

1. A control for a driving heat source inlet in an absorption refrigerant cycle comprising:

a T connection, said T connection having a first leg to be connected to a source of heated fluid, and said T connection having a second leg to be connected to the inlet of a driving heat source for a refrigerant absorption cycle, a third leg of said T communicating said heated fluid to a heat sink;

a first and second valve body received within said T connection, said first valve body controlling the amount of heated fluid being directed through said second leg, and said second valve body controlling the amount of heated fluid being communicated through said third leg, a control for controlling movement of said first and second valve bodies such that they are generally moved in opposition to each other; and an outer periphery of said shafts received within said bearings is non-cylindrical such that a contact area between said shaft and an inner periphery of said bearing is reduced.

2. The control as set forth in claim 1, wherein said contact area is between 10-65 percent of said inner periphery.

3. A control for a driving heat source inlet in an absorption refrigerant cycle comprising:

a T connection, said T connection having a first leg to be connected to a source of heated fluid, and said T connection having a second leg to be connected to the inlet of a driving heat source for a refrigerant absorption cycle, a third leg of said T communicating said heated fluid to a heat sink;

a first and second valve body received within said T connection, said first valve body controlling the amount of heated fluid being directed through said second leg, and said second valve body controlling the amount of heated fluid being communicated through said third leg, a control for controlling movement of said first and second valve bodies such that they are generally moved in opposition to each other; and a blower supplies a cooling air flow into an interior of said T connection, with said blower having a check valve on a line between an outlet of said line entering into said T connection and said blower motor.

* * * * *